G. M. PRATT.
Clutch for Band-Wheel of Sewing-Machine.
No. 209,712. Patented Nov. 5, 1878.
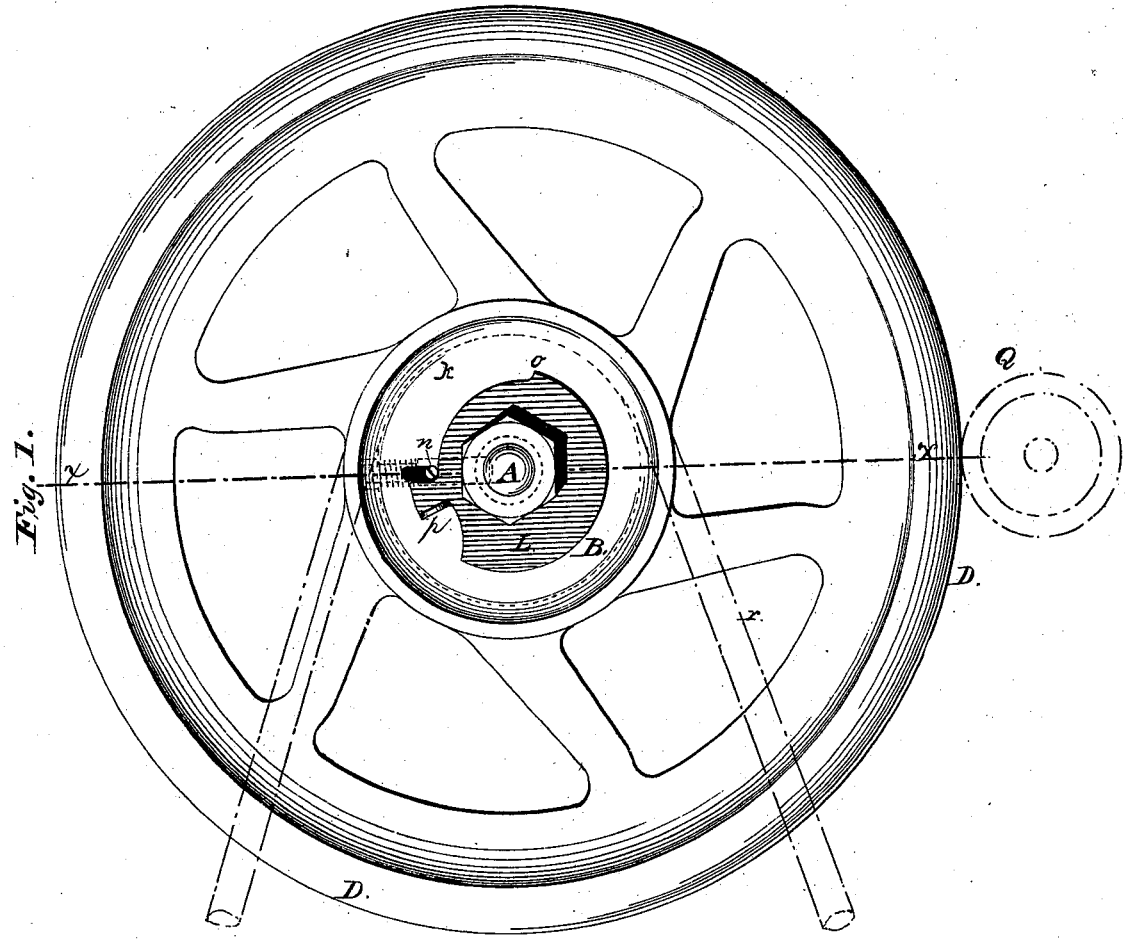
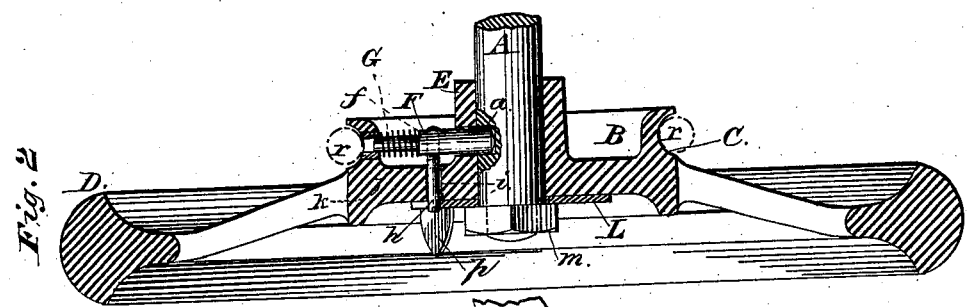
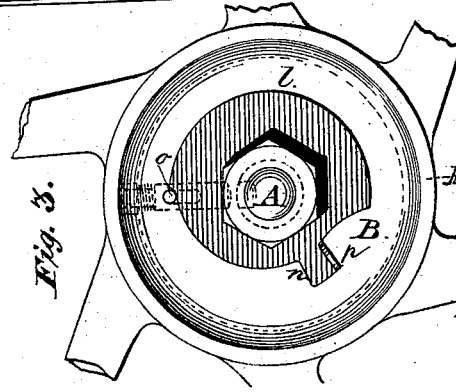
Witnesses:
Inventor:
Geo. M. Pratt.
By James L. Norris.
Attorney.

UNITED STATES PATENT OFFICE.

GEORGE M. PRATT, OF MIDDLETOWN, CONNECTICUT, ASSIGNOR TO THE VICTOR SEWING MACHINE COMPANY, OF SAME PLACE.

IMPROVEMENT IN CLUTCHES FOR BAND-WHEELS OF SEWING-MACHINES.

Specification forming part of Letters Patent No. 209,712, dated November 5, 1878; application filed September 11, 1878.

*To all whom it may concern:*

Be it known that I, GEORGE M. PRATT, of Middletown, in the county of Middlesex and State of Connecticut, have invented certain new and useful Improvements in Clutches for Band-Wheels of Sewing-Machines, of which the following is a specification:

This invention relates to an improvement in the means of operating the bobbin-winders of sewing-machines; and its object is to enable the operator of the machine to operate the bobbin-winder without removing the work from under the needle or shifting belts; and to this end it consists in a rotary shaft provided with a radial socket and a pulley having a perforated collar and a perforated hub portion, a vertical pin being surrounded by a spring and adapted to engage with the socket in the shaft, a pivoted cam serving to act on said pin in order to release it from the socket in the shaft, all in such manner that the pulley can be fastened to or unfastened from the operating-shaft at will, in order that by its movement it may rotate said shaft or run loosely thereupon, the latter being desirable when the bobbin-winder alone is to be operated by contact of a friction-wheel with the smooth periphery of the rim of the pulley and the sewing mechanism to remain idle, the former when the rotation of the pulley is to communicate motion through its shaft to the sewing mechanism of the machine. By this construction the machine may be stopped in any position, and the bobbin-winder operated without removing the work from under the needle, or any attention being required by the sewing mechanism.

In the accompanying drawings, Figure 1 is a view of a pulley mounted on a rotary shaft of a sewing-machine, showing a portion of the engaging and disengaging devices; and Fig. 2 is a section on line *x x*, Fig. 1. Fig. 3 shows the cam in a different position from Fig. 1.

The letter A indicates a rotary shaft of a sewing-machine, and is supposed to communicate motion to the stitching mechanism. A pulley, B, is mounted on the end of this shaft, and is provided with a belt-rim or cord-sheave, C, and a rim, D, having a larger diameter and a smooth periphery, adapted for rolling frictional contact with the friction-wheel of a bobbin-winder. The construction of bobbin-winders driven by friction-wheels is so familiar to the public as to render a description thereof here unnecessary. At the eye of the pulley B is a collar, E, within the rim or sheave C, and through the wall of this collar is a hole, in which fits loosely a pin, F, the outer portion of which is contracted above a shoulder, *f*, and has its end fitted loosely in a hole in the rim C. On this contracted portion of the pin F, and between the shoulder *f* and the inner periphery of the rim C, is a spiral spring, G, which forces the pin inward and causes it to enter a radial socket, *a*, in the shaft A when said socket coincides within it. Laterally from the pin F projects a pin, *h*, through a radial slot, *i*, cut in the hub portion *k* of the pulley, and outward somewhat beyond the face of said portion, so as to bear upon the edge of a cam, L, mounted loosely upon the shaft A, and retained on the outer face of the hub portion of the pulley and a nut, *m*, on the screw-threaded tip of the shaft. On the periphery of this cam, and between two shoulders, *n* and *o*, is a curved face, *l*, the end of which at the shoulder *o* is farthest from the center of the cam, and the end at the shoulder *m* considerably nearer said center, so that when the cam, by means of a projecting thumb-piece, *p*, is turned so that the shoulder *o* strikes the pin *h*, said pin will be forced outward in the slot *i*, and the pin F lifted out of the socket in shaft A, so that the pulley will be disengaged and allowed to revolve independently of the shaft. In this position the cam is turned when the friction-wheel Q of the bobbin-winder (shown in dotted lines) is brought in contact with the smooth periphery of the rim D for the purpose of operating the said winder. When the cam L is turned so that the shoulder *n* strikes the pin *h*, the inward curve of the face *l* permits the spiral spring to force the pin *h* inward in its slot, and the pin F will enter the socket in the shaft as soon as the rotation of the pulley brings it into coincidence therewith, and the said pulley thus becomes locked to the shaft, and its rotation will communicate motion through said shaft to the stitching mechanism of a sewing-machine.

The letter *r* indicates a cord or belt passing around the rim C, and it may also pass around the driving pulley or wheel of the machine.

It will be obvious that the foregoing-described arrangement for engaging and disengaging a pulley from a shaft may be applied to other machines besides sewing-machines; but it is to the latter I have contemplated its application, more especially as the operator is not required to change position or remove the work, as before mentioned.

What I claim is—

1. The rotary shaft A, having a radial socket, $a$, in combination with the pulley B, the vertical spring-pin F, adapted to engage said socket, and the pivoted cam L on the face of the pulley adapted to engage the spring-pin for releasing it from the socket in the shaft, substantially as described.

2. The combination of shaft A, having the radial socket, the pulley having the perforated collar and rim C, and the slotted hub portion $k$, and the pin F, surrounded by a spiral spring, and having projecting pin $h$, and the cam L, substantially as described.

In testimony that I claim the foregoing I have hereunto set my hand in the presence of the subscribing witnesses.

GEO. M. PRATT.

Witnesses:
W. L. BLAKE,
F. D. SLOAT.